United States Patent
Saito et al.

(10) Patent No.: US 7,611,639 B2
(45) Date of Patent: **\*Nov. 3, 2009**

(54) GLASS SUBSTRATE FOR INFORMATION RECORDING MEDIUM AND METHOD FOR MANUFACTURING SAME

(75) Inventors: Yasuhiro Saito, Osaka (JP); Toshiaki Hashimoto, Osaka (JP); Yuriko Kudoh, Osaka (JP)

(73) Assignee: Hoya Corporation, Tokyo (JP)

( * ) Notice: Subject to any disclaimer, the term of this patent is extended or adjusted under 35 U.S.C. 154(b) by 633 days.

This patent is subject to a terminal disclaimer.

(21) Appl. No.: 10/532,538

(22) PCT Filed: Oct. 22, 2003

(86) PCT No.: PCT/JP03/13461
§ 371 (c)(1),
(2), (4) Date: Aug. 17, 2005

(87) PCT Pub. No.: WO2004/042709
PCT Pub. Date: May 21, 2004

(65) Prior Publication Data
US 2006/0003170 A1  Jan. 5, 2006

(30) Foreign Application Priority Data
Oct. 23, 2002 (JP) ............... 2002-308812

(51) Int. Cl.
C03C 15/00 (2006.01)
G11B 5/84 (2006.01)
G11B 7/26 (2006.01)
(52) U.S. Cl. ............... 216/22; 216/24; 216/83; 216/88; 216/89; 216/97
(58) Field of Classification Search .......... None
See application file for complete search history.

(56) References Cited

U.S. PATENT DOCUMENTS

| 6,395,634 | B1 | 5/2002 | Miyamoto |
| 6,440,531 | B1 * | 8/2002 | Kurachi et al. ............ 428/141 |
| 6,475,599 | B1 * | 11/2002 | Saito et al. ............ 428/141 |
| 6,491,572 | B1 | 12/2002 | Horie et al. ............ 451/63 |
| 6,553,788 | B1 * | 4/2003 | Ikeda et al. ............ 65/31 |

(Continued)

FOREIGN PATENT DOCUMENTS

JP          5/342532          12/1993

(Continued)

OTHER PUBLICATIONS

U.S. Appl. No. 10/532,564, filed Apr. 22, 2004 entitled, "Glass Substrate for Information Recording Medium and Method for Manufacturing Same." (Related).

(Continued)

Primary Examiner—Anita K Alanko
(74) Attorney, Agent, or Firm—Workman Nydegger

(57) ABSTRACT

A method for manufacturing a glass substrate having projections of the same height. The method includes forming a surface layer having a decreased chemical resistance on a glass plate, forming a texture including a plurality of projections having upper portions included in the surface layer, and selectively removing the surface layer.

12 Claims, 3 Drawing Sheets

U.S. PATENT DOCUMENTS

| | | | |
|---|---|---|---|
| 6,668,587 B2 * | 12/2003 | Fujimura et al. | 65/30.14 |
| 6,706,427 B2 * | 3/2004 | Shibui et al. | 428/846.9 |
| 6,715,318 B2 * | 4/2004 | Mitani et al. | 65/30.1 |
| 6,743,529 B2 * | 6/2004 | Saito et al. | 428/846.9 |
| 6,782,717 B2 * | 8/2004 | Saito et al. | 65/30.14 |
| 6,821,893 B2 * | 11/2004 | Kurachi et al. | 438/690 |
| 7,140,203 B2 * | 11/2006 | Saito et al. | 65/30.14 |
| 2002/0127432 A1 * | 9/2002 | Saito et al. | 428/694 SG |
| 2003/0109202 A1 * | 6/2003 | Matsuno et al. | 451/41 |
| 2003/0110803 A1 * | 6/2003 | Saito et al. | 65/30.14 |
| 2006/0062129 A1 | 3/2006 | Saito et al. | |

FOREIGN PATENT DOCUMENTS

| | | |
|---|---|---|
| JP | 2000-348344 | 12/2000 |
| JP | 2001/294447 | 10/2001 |
| JP | 2001/341058 | 12/2001 |
| JP | 2002/133649 | 5/2002 |
| JP | 2002-150547 | 5/2002 |
| JP | 2002/251716 | 9/2002 |
| JP | 2004-145958 | 5/2004 |

OTHER PUBLICATIONS

U.S. Appl. No. 10/532,550, filed Apr. 22, 2005 entitled, "Glass Substrate for Information Recording Medium and Method for Manufacturing the Same." (Related).

* cited by examiner

GLASS SUBSTRATE FOR INFORMATION RECORDING MEDIUM AND METHOD FOR MANUFACTURING SAME

FIELD OF THE INVENTION

The present invention relates to a glass substrate for an information recording medium, such as a magnetic disk, a magneto-optical disk, or an optical disk, and a method for manufacturing the same, and more particularly, to a glass substrate having a surface, in which a texture extending in the circumferential direction is formed, and a method for manufacturing the same.

BACKGROUND OF THE INVENTION

A magnetic disk for a hard disk drive is known as one type of information recording medium. The magnetic disk is a disk having a center hole and is fabricated by superimposing magnetic films on the surface of a glass substrate. The magnetic disk is rotated by a spindle received in the center hole. Information recorded on the magnetic disk is read by a magnetic head, which moves along the surface of the magnetic disk in a state levitated from the surface by a certain distance.

It is desirable for the magnetic disk to have a high recording density to increase the recording capacity of the magnetic disk. Japanese Laid-Open Patent Publication No. 2002-251716 describes a method for increasing the recording density of a magnetic disk by forming ridge-shaped projections, or a texture, extending in the circumferential direction along the surface of a glass substrate so as to increase the magnetic anisotropy. More specifically, material, or a glass plate, for forming a glass substrate is prepared. The surface of the glass plate is polished in a number of stages to be smoothed. Then, a scrubbing tape scrubs the surface of the glass plate in the circumferential direction while supplying the surface with an abrasive to form the texture.

In comparison with a glass substrate that does not have a texture, a textured glass substrate resists the adhering (sticking) of a moving magnetic head to the disk surface. Since the textured glass substrate resists sticking, the distance between the disk surface and the head may be decreased. Generally, decrease in the distance between the disk surface and the magnetic head enables an increase in the recording density of a magnetic disk. Thus, the textured glass substrate is advantageous for increasing the recording density.

However, the formation of a texture having projections with uniform apexes is difficult, and an uneven texture having deficiencies such as abnormally tall projections may be formed. When the distance between the disk surface and the magnetic head is small, with a magnetic disk formed from a glass substrate having an uneven texture, the moving magnetic head may crash against or become caught in the abnormal projections thereby causing glide errors. In such a magnetic disk, the distance between the disk surface and the magnetic head must be increased to avoid the occurrence of glide errors. In other words, the levitation height of the head for such a magnetic disk is high. Accordingly, there is a shortcoming in that even if textured glass substrates are manufactured through the same process, the head levitation height differs depending on whether the texture has a deficiency.

To reduce deficiencies in the texture, the surface of the glass substrate is rubbed with a hard sponge or is etched. By rubbing the surface of the glass substrate with a hard sponge to partially remove abnormal projections, abnormally tall projections are removed. However, there is a possibility of the surface of the glass substrate being scratched. By etching the surface of the glass substrate, the top portions of abnormal projections are isotropically etched, and abnormally tall projections are removed. However, the etching eliminates small (normal) projections and pits. Thus, there is a possibility of the texture being shaped differently from the desired shape. Scratches in the disk surface or a texture having a different shape are factors that cause glide errors or sticking. This increases the crashing frequency of the magnetic head and the frequency the magnetic disk is scratched. Thus, a glass plate having the desired texture cannot be manufactured with a high yield.

SUMMARY OF THE INVENTION

It is an object to provide a glass substrate having high quality and to provide a method enabling the manufacture of a high quality glass substrate with a high yield.

One aspect of the present invention is a method for manufacturing a glass substrate for an information recording medium. The manufacturing method includes forming a surface layer on a surface of a disk-shaped glass plate having a predetermined composition and a predetermined chemical resistance, with the surface layer having a composition differing from the predetermined composition and a chemical resistance that is lower than the predetermined chemical resistance, scrubbing the surface with an abrasive and a scrub member to form a texture including a plurality of projections extending in a circumferential direction of the surface, and selectively removing an upper portion of the surface layer that is part of the plurality of projections with an etching liquid.

Another aspect of the present invention is a method for manufacturing a glass substrate for an information recording medium. The manufacturing method includes preparing a disk-shaped glass plate having a predetermined composition and a predetermined chemical resistance, polishing the glass plate to forming a smooth surface, chemically processing the smooth surface to form a surface layer having a composition differing from the predetermined composition, a chemical resistance that is lower than the predetermined chemical resistance, and a first thickness, forming a texture including a plurality of projections on the surface, the projections extending over the surface layer and a lower layer adjacent to the surface layer, and selectively removing only part of the plurality of projections included in the surface layer so that the plurality of projections have flat upper surfaces that are flush with each other.

A further aspect of the present invention is a glass substrate for an information recording medium. The glass substrate has a ratio of the maximum peak maximum peak height relative to the arithmetic mean roughness that is 10 or less.

DETAILED DESCRIPTION OF THE PREFERRED EMBODIMENTS

A glass substrate and a method for manufacturing the same according to an embodiment of the present invention will now be described.

Figure 1:
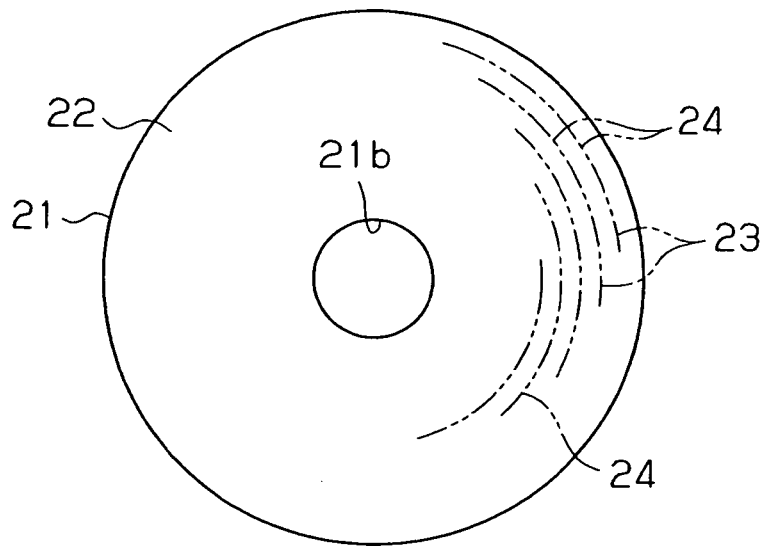
FIG. 1 is a plan view showing a glass substrate according to an embodiment of the present invention.

As shown in FIG. 1, an information recording medium glass substrate 21 is a disk having a center hole 21b. The glass substrate 21 is made of a multi-component glass material that contains silicon oxide and at least one of aluminum oxide and alkaline earth metal oxide.

Examples of multi-component glass materials include soda lime glass, aluminosilicate glass, borosilicate glass and crystallization glass that are fabricated through a float process, a down draw process, a redraw process, or a pressing process. The main components of soda lime glass include silicon dioxide ($SiO_2$), sodium oxide ($Na_2O$), and calcium oxide (CaO). The main components of aluminosilicate glass include $SiO_2$, aluminum oxide ($Al_2O_3$), and $R_2O$ (R is potassium (K), and sodium (Na) or lithium (Li). Examples of a crystallization glass include lithium oxide ($Li_2O$)—$SiO_2$ glass, $Li_2O$—$Al_2O_3$—$SiO_2$ glass, and RO—$Al_2O_3$—$SiO_2$ glass. RO represents alkaline earth metal oxide, and R represents magnesium (Mg), calcium (Ca), strontium (Sr), or barium (Ba).

A chemical strengthened glass fabricated by adding zirconium oxide ($ZrO_2$) or titanium oxide ($TiO_2$) to soda lime glass, aluminosilicate glass, borosilicate glass, or crystallization glass may be used as the multi-component glass material.

A plurality of films including a protective film and a magnetic film, which is made of metals or alloys of, for example, cobalt (Co), chromium (Cr), and iron (Fe), are formed on the surface 22 of the glass substrate 21 to manufacture the information recording medium. The information recording medium is rotatably supported in an information recorder such as a hard disk drive. The information recorder includes a head that records information on the information recording medium and reads information from the information recording medium.

The head moves along the surface of the rotating information recording medium to a position where the desired recording information is recorded (seek operation). To prevent noise from being produced and deficiencies, such as scratching of the information recording medium, from occurring, the ideal seek operation is performed in a state in which the head is levitated from the surface of the information recording medium. Due to the demand for a higher recording density over these recent years, the actual levitation height of the head from the surface of the information recording medium is 5 nm or less. The head momentarily contacts the surface of the information recording medium during the seek operation.

Figure 2A:
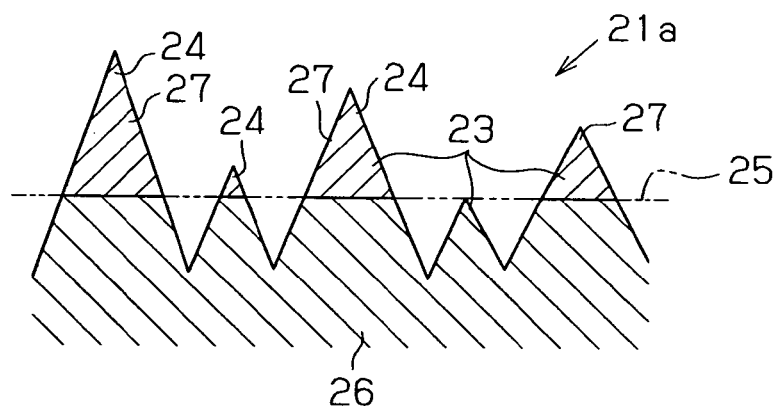
FIG. 2A is a partial cross-sectional view showing the surface of a glass plate on which a texture is formed.
Figure 2B:
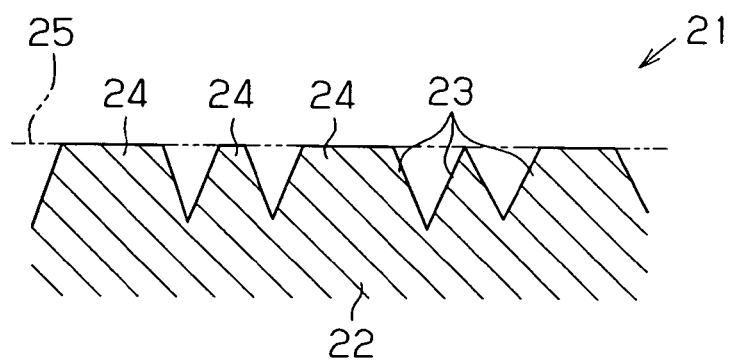
FIG. 2B is a partial cross-sectional view showing the surface of the glass substrate of the embodiment.

To prevent adhesion between the information recording medium and the head, the surface 22 of the glass substrate 21 has a texture 23 including a plurality of projections 24. The projections 24 concentrically extend in the circumferential direction of the glass substrate 21. As shown in FIG. 2B, the texture 23 is formed so that the peaks of the projections 24 do not exceed a reference line 25, and more preferably, so that they are aligned with the reference line 25. That is, as shown in FIG. 2A, portions of the projections 24 having top ends that are higher than the reference line 25, more specifically, portions higher than the reference line 25 are selectively removed to form projections 24 having flat top surfaces. The projections 24 with top ends that are not higher than the reference line 25 have acute peaks.

When used as an information recording medium, the glass substrate (textured glass substrate) 21, of which surface 22 includes the texture 23, has a head contact area that is smaller than a glass substrate having a smooth or extremely smooth surface. Thus, the textured glass substrate 21 suppresses adhesion between the surface of the information recording medium and the head that would be caused by a viscous material, such as lubrication oil, applied to the surface of the information recording medium. The texture 23 is formed by projections 24 having the same height as the reference line 25. This avoids the head from crashing against or being caught in side surfaces of the projections during seek operations and prevents glide errors from occurring. Since glide errors are prevented from occurring even if the levitation height of the head is lowered, the distance between the surface of the information recording medium and the head may be decreased. Thus, the glass substrate 21 is optimal for increasing the recording density of an information recording medium.

The surface roughness of the glass substrate 21, that is, the range of the arithmetic mean roughness Ra measured with an atomic force microscope (AFM, manufactured by Digital Instruments, Inc.), is preferably 0.1 to 1.5 nm, more preferably 0.1 to 1.0 nm, and most preferably 0.1 to 0.6 nm. If the surface roughness is greater than the above range, glide errors are apt to occur and the levitation height of the head is raised. If the surface roughness Ra is less than 0.1 nm, the polishing time for manufacturing the glass substrate 21 is lengthened thereby decreasing yield and increasing the manufacturing cost of the glass substrate 21. Further, the projections 24 become small, the head contact area increases, and sticking is apt to occur.

The maximum peak height Rp, which is measured by an AFM, of the textured glass substrate 21 is preferably 10 nm or less. When the maximum peak height Rp exceeds 10 nm, abnormally tall protuberances (asperities) on the surface 22 of the glass substrate 21 tend to cause glide errors. This raises the levitation height of the head.

The ratio of Ra and Rp (Rp/Ra ratio) is preferably 10 or less. If the Rp/Ra ratio exceeds 10, the surface roughness becomes uneven and it becomes difficult for the head to pass over protuberances and asperities thereby resulting in the tendency of glide errors occurring. This raises the levitation height of the head.

A method for manufacturing the glass substrate 21 will now be described.

Figure 3:
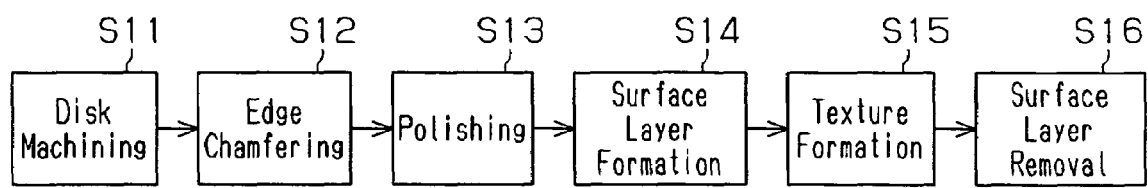
FIG. 3 is a flowchart showing a process for manufacturing a glass substrate according to an embodiment of the present invention.

FIG. 3 is a flowchart showing the method for manufacturing the glass substrate 21. The manufacturing method includes a disk machining process S11, an edge chamfering process S12, a polishing process S13, a surface layer formation process S14, a texture formation process S15, and a surface layer removal process S16.

In the disk machining process S11, a cutter made of cemented carbide alloy or diamond is used to cut a sheet of a multi-component glass material and obtain a glass plate 21a having a center hole 21b.

In the edge chamfering process S12, the glass plate 21a is ground to obtain the predetermined outer diameter and inner diameter. Further, the corners at the inner and outer circumferences are chamfered by performing polishing.

In the polishing process S13, the surface of the glass plate 21a is polished and smoothed. It is preferred that the polishing process S13 be performed in two stages, a former stage polishing process and a latter stage polishing process. The former stage polishing process removes warps, undulations, and deficiencies such as irregularities and cracks, so that the surface of the glass plate 21a is flat and has an even thickness. In the former stage polishing process, an abrasive of which grain diameter is relatively coarse is used. Further, either a polishing pad is not used or one that is hard and coarse is used.

In the latter stage polishing process, the glass substrate is polished so as to satisfy the surface smoothness required for an information recording medium. The surface roughness of the glass plate 21a subsequent to the latter stage polishing process is equivalent to that of the glass substrate 21. That is, the glass plate 21a is polished until the arithmetic mean roughness Ra becomes 1.5 nm or less.

The abrasive used in the latter stage polishing process has a relatively fine grain diameter and high affinity with respect to glass material and is, for example, a rare earth oxide, such as cerium oxide or lanthanum oxide, or colloidal silica. It is preferred that the polishing pad be made of a soft and fine material such as, synthetic resin foam or suede.

The former stage polishing process and the latter stage polishing process may each be divided into further plural stages to improve the polishing efficiency and surface smoothness of the glass plate 21a. It is preferred that washing be performed to remove the abrasive and polishing dusts remaining on the surface of the glass plate 21a.

Figure 5A:
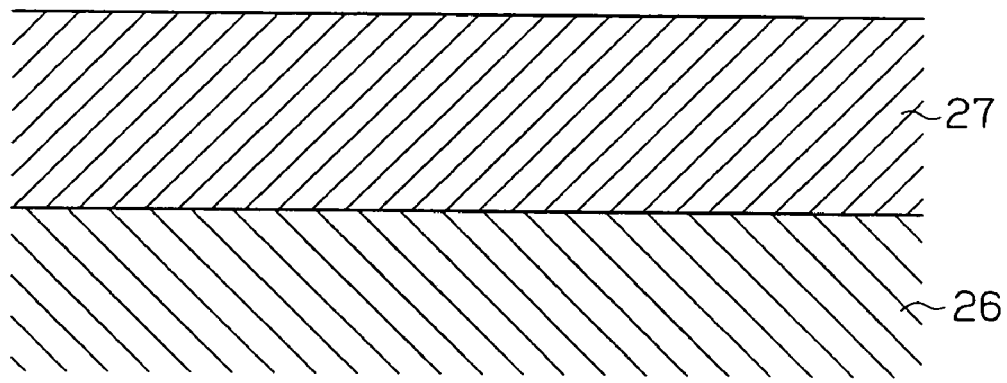
FIG. 5A is a cross-sectional view showing the glass plate in which the surface layer is formed.

In the surface formation process S14, as shown in FIG. 5A, a surface layer 27 is formed on the polished glass plate 21a. The composition of the surface layer 27 differs from the composition of an inner portion of the glass plate 21a, or the portion 26 excluding the surface layer 27. The chemical resistance of the surface layer 27 is lower than that of the inner portion 26.

In the surface layer formation process S14, for example, the surface of the glass plate 21a is deformed by a strong acid solution to form the surface layer 27. Then, the thickness or level of deformation of the surface layer 27 is adjusted with a strong alkaline solution. Contact with the strong acid solution causes alkaline earth metal oxides and aluminum oxides near the surface of the glass plate 21a to dissolve into the strong acid solution as alkaline earth metal ions and aluminum ions thereby forming a deformed surface layer. Contact with the strong alkaline solution uniformly etches the surface layer 27. This removes the excessively deformed portion of the surface layer 27, and removes part of the surface layer 27 to obtain the desired thickness.

The ion radii of the alkaline earth metal ions and aluminum ions are relatively large. Thus, large voids are formed in the molecular frame of the glass at the surface of the glass plate 21a from which the alkaline earth metal ions and aluminum ions are removed. When such surface of the glass plate 21a comes into contact with chemicals, such as the acid solution or the alkaline solution, other ions derived from the chemicals enter the voids thereby affecting the Si—O bonding in the glass molecules near the surface. Accordingly, the chemical resistance, that is, acid resistance and alkaline resistance, of the surface layer 27 is decreased.

The surface layer 27 may be formed in the polishing process S13 with a strong acid or strong alkaline polishing agent (polishing liquid). In this case, the polishing process S13 and the surface layer formation process S14 may be performed in a single process. This reduces the number of processes for forming the glass substrate 21.

It is preferred that the surface layer 27 be formed by immersing the glass plate 21a in a strong acid or strong alkaline solution. In this case, change in the immersion time adjusts the penetration level of the strong acid and strong alkaline solutions in the glass plate 21a. This adjusts the thickness of the surface layer 27.

It is preferred that strong acid solution having a pH of 3.0 or less be used. When the pH exceeds 3.0, alkaline earth metal ions or aluminum ions cannot be sufficiently dissolved, and the surface of the glass plate 21a cannot be sufficiently deformed. As the strong acid liquid, at least one selected from hydrofluoric acid, fluosilicic acid, sulfuric acid, hydrochloric acid, sulfamic acid, acetic acid, tartaric acid, citric acid, gluconic acid, malonic acid, and oxalic acid may be used.

It is preferred that a strong alkaline solution having a pH of 10.5 or greater be used. If the pH is less than 10.5, uniform etching of the surface layer 27 becomes difficult. Thus, it becomes difficult to adjust and control the thickness and deformation level of the surface layer 27. As the strong alkaline solution, at least one selected from a non-organic alkaline solution, such as a potassium hydroxide solution, a sodium hydroxide solution, or ammonia water, and an organic solution, such as tetraammonium hydride, may be used.

Figure 5B:
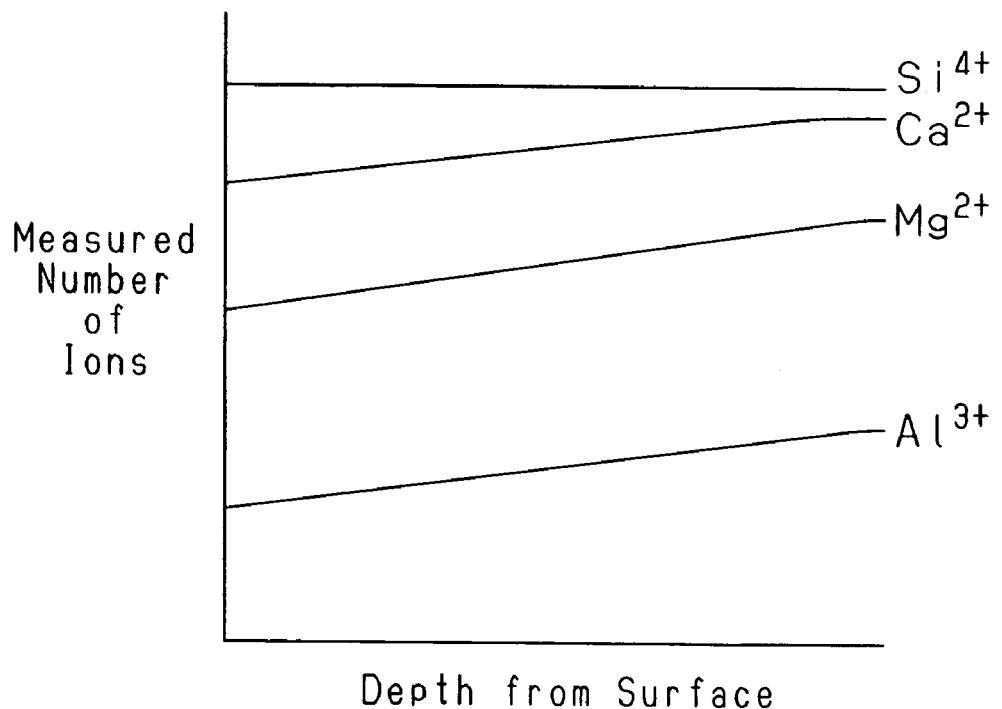
FIG. 5B is a graph showing the relationship between the depth and composition of the glass substrate.

FIG. 5B is a graph showing depths from the surface of the aluminosilicate glass, in which the surface layer 27 is formed, and the number of ions for each type of component measured by a secondary ion mass spectrometer (SIMS).

It is apparent from the measurement results that the number of calcium ions ($Ca^{2+}$) and magnesium ions ($Mg^{2+}$), which are alkaline earth metal ions, and aluminum ions ($Al^{3+}$) decreases at positions closer to the surface of the glass plate 21a. That is, the calcium ions, magnesium ions, and aluminum ions in the surface layer 27 are less than that in the inner portion 26. As for silicon ions ($Si^{4+}$) derived from silicon oxide, the number of ions is the same in the inner portion 26 and the surface layer 27. Accordingly, the content of silicon oxides in the surface layer 27 is relatively increased with respect to the inner portion 26 by the decrease of $Ca^{2+}$, $Mg^{2+}$, and $Al^{3+}$.

More specifically, it is preferred that the ingredient ratio of silicon oxide in the glass composition of the surface layer 27 relative to the ingredient ratio of silicon oxide in the glass composition of the inner portion 26 be greater by more than 1.0 times but less than or equal to 1.4 times. If the ingredient ratio of silicon oxide in the surface layer 27 becomes greater than the ingredient ratio of the inner portion 26 by 1.4 times, the chemical resistance excessively decreases. Thus, for example, when a weak acid or weak alkaline washing liquid is used to wash the glass plate 21a, there is a possibility of ridges and valleys being formed on the surface of the glass plate 21a in addition to the texture 23.

The thickness of the surface layer 27 is preferably 1 to 7 nm, more preferably 2 to 6 nm, and most preferably 2 to 5 nm. If the surface layer 27 is too thin, it may become difficult for the optimal thickness to be left on the surface layer 27 in the texture formation process S15. Further, the entire surface layer 27 may be removed and the projections may have different heights. If the surface layer 27 is excessively thick, the elimination amount in the texture formation process S15 increases and it may become difficult for the optimal thickness to be left on the surface layer 27. Further, the texture 23 may be formed only in the surface layer 27, and the texture 23 may be eliminated during removal of the surface layer 27.

In the texture formation process S15, the texture 23 is formed on the glass plate 21a. In the texture formation process S15, a texture machine, which is normally used to perform texture processing on an aluminum substrate, is used. The texture machine will now be described.

Figure 4:
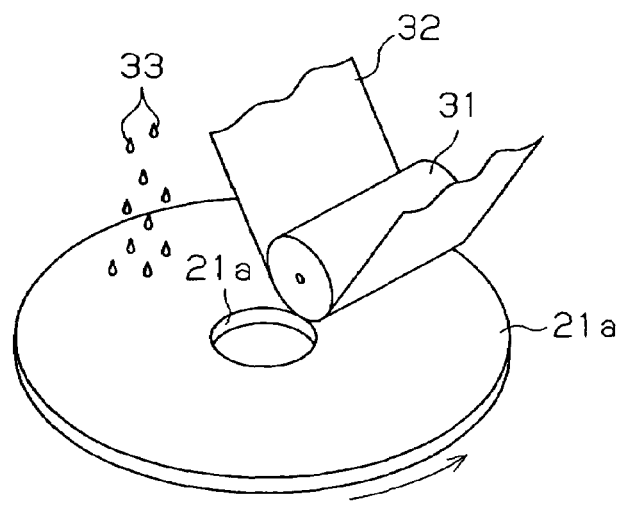
FIG. 4 is a schematic diagram showing an apparatus for forming a texture on the glass plate.

As shown in FIG. 4, a roller 31 is rotatably supported immediately above the glass plate 21a. The roller 31 has a length that is substantially equal to the radius of the glass plate 21a and extends in the radial direction of the glass plate 21a. A tape 32, which functions as a scrub member, is arranged between the roller 31 and the glass plate 21a to pass from one side of the roller 31, into the space between the glass plate 21a and the roller 31, and out of the other side of the roller 31. The pressure of the roller 31 presses the tape 32 against the surface 15 of the glass plate 21a as the tape 32 passes through the space between the glass plate 21a and the roller 31. Further, diamond slurry 33, which serves as an abrasive, is dropped on the surface of the glass plate 21a. As the glass plate 21a rotates in the direction of the arrow in FIG. 4, the tape 32 slides along the surface of the glass plate 21a, and the surface is ground while being controlled in a satisfactory manner to form the texture 23.

The material of the tape 32 is not particularly limited, and any material, such as a tape-shaped cloth, non-woven cloth, or flocked article of polyethylene fibers or the like may be used as long as it can be used to form such type of texture. The diamond slurry 33 is obtained by dispersing diamond abrasion grains, which serve as abrasive particles, in a dispersion solvent such as water. The grain diameter and shape of the diamond abrasion grains is determined in accordance with the required density of the texture 23. The average grain diameter ($D_{50}$) of the diamond abrasion grains is preferably 0.05 to 0.3 μm, and more preferably 0.08 to 0.25 μm. If $D_{50}$ is less than 0.05 μm, the capability of abrasion of the glass plate 21a is insufficient. This lowers the formation speed of the texture 23, decreases the yield of the glass substrate 21, and increases the processing cost. If $D_{50}$ exceeds 0.3 μm, the texture 23 may not be evenly formed in the radial direction of the glass plate 21a.

In the texture formation process S15, the surface portion of the glass plate 21a is ground so as to leave the surface layer 27 and form the texture 23, which includes the plurality of projections 24, as shown in FIG. 2A. In this state, the projections 24 have different heights and include acute peaks. The top ends of some of the projections are higher than the reference line 25, or the boundary between the lower layer 26 and the surface layer 27 of the glass plate 21a. That is, the portions above the reference line 25 are included in the surface layer 27.

In the texture formation process S15, a predetermined depth that is in accordance with the depth of the surface layer 27, more specifically, an average of 10 nm or less is removed from the surface layer 27. If the removal amount exceeds 10 nm, the surface 22 of the glass substrate 21 may roughen. As a result, glide errors are apt to occur and the levitation height of the head may be raised.

In the surface layer removal process S16, the surface layer 27 is removed from the textured glass plate 21a. More specifically, the glass plate 21a is immersed in an etching liquid. The etching liquid dissolves and removes the top portions of the projections 24 on the surface layer 27, which has a decreased chemical resistance. As shown in FIG. 2B, the portions corresponding to the surface layer 27 are selectively removed to form the texture 23, which includes the plurality of projections 24 having the same height.

It is preferred that the etching liquid be alkaline and have a low etching capability with respect to glass materials so that only the surface layer 27 is etched and the lower layer 26 is unaffected. An acid etching liquid has a higher etching capability than an alkaline etching liquid. Thus, not only the surface layer 27 that has a decreased chemical resistance but also the lower layer 26 may be etched.

The preferred etching liquid is an alkaline solution having a pH of 11.0 to 13.0. If the pH is less than 11.0, the etching capability is too low and the surface layer 27 may not be sufficiently etched and removed. If the pH exceeds 13.0, the excessive etching capability may also etch the lower layer 26. Further, at least one of those used before in the surface layer formation process S14 may be used as the alkaline solution. To wash the surface of the glass plate 21a, a builder, such as a surfactant, a chelating agent, and an organic solvent, may be added to the alkaline solution used as the etching liquid.

The embodiment has the advantages described below.

In the method for manufacturing the glass substrate 21, the disk machining process S11, the edge chamfering process S12, the polishing process S13, the surface formation process S14, the texture formation process S15, and the surface elimination process S16 are sequentially performed. In the surface formation process S14, the glass composition in the surface of the glass plate 21a is changed, and the surface layer 27 having a decreased chemical resistance is formed in the surface. In the texture formation process S15, the surface of the glass plate 21a is ground so as to leave the surface layer 27. This forms the texture 23 including the projections 24 on the surface. In the surface layer removal process S16, the portions (top ends) of the projections 24 corresponding to the surface layer 27 are etched and removed so that the projections 24 have the same height. This manufactures the glass substrate 21, which enables the levitation height of the head to be lowered, with a high yield.

Further, the surface layer removal process S16 uses an alkaline etching liquid having an etching capability that is lower than that of an acid etching liquid. Thus, only the surface layer 27 may be selectively eliminated without affecting the lower layer 26 of the glass plate 21a.

In the surface layer formation process S14, alkaline earth metal ions or aluminum ions are dissolved from the glass plate 21a to form the surface layer 27 of which silicon oxide content is relatively higher than the silicon oxide content of the lower layer 26. Alkaline earth metal ions or aluminum ions are selectively and easily dissolved. Thus, adjustment of the chemical resistance of the surface layer 27 is relatively simple.

The surface layer 27 has a thickness of 1 to 7 nm. Thus, in the texture formation process S15, the surface layer 27 may be formed with an appropriate thickness for the top portions of the projections 24, and the projections 24 are easily adjusted to have the same height.

In the surface formation process S14, the glass plate 21a is immersed in a strong acid solution having a pH of 3.0 or less and then immersed in a strong alkaline solution having a pH of 10.5 or greater. Change in the immersion time of the glass plate 21a adjusts the penetration level of the strong acid and strong alkaline solutions in the surface of the glass plate 21a. This facilitates adjustment of the thickness of the surface layer 27.

The Rp/Ra ratio of the manufactured glass substrate 21 is less than or equal to 10. That is, the projections 24 generally have the same height. Accordingly, the glass substrate 21 manufactured with satisfactory yield is optimal for use as an information recording medium that avoids glide errors.

Examples of the present invention and comparative examples will now be described.

EXAMPLE 1

A glass plate having a size with a thickness of 0.6 mm, an outer diameter of 65 mm, and an inner diameter of 20 mm was prepared from an aluminosilicate glass sheet. The composition of the aluminosilicate glass sheet was $SiO_2$ 63 mol %, $Al_2O_3$ 16 mol %, $Na_2O$ 11 mol %, $Li_2O$ 4 mol %, MgO 2 mol %, and CaO 4 mol %. Subsequently, the glass plate was immersed in sulfuric acid having a concentration of 3% and a pH of less than 1 for three minutes under a temperature of 35° C. and then immersed in a potassium hydroxide solution (KOH) having a concentration of 0.01% for three minutes under a temperature of 35° C. This formed a surface layer having a thickness of 3 nm. Afterwards, a texture was formed on the glass plate under the next conditions.

Material of tape: polyester
Tension of tape: 22.1 N
Velocity of tape: 7.6 cm/min
Pressing force of roller: 30.9 N
Rotation speed of glass plate: 300 rpm
Supply amount of diamond slurry: 20 ml/min
Grain diameter of diamond abrasion grains: 0.2 μm After the formation of the texture, the glass plate was immersed in a potassium hydroxide solution having a concentration of 1% for three minutes under a temperature of 35° C. to remove the surface layer and obtain the glass substrate of example 1.

An AFM was used to measure the Ra and Rp on the surface of the glass substrate at ten or more locations. The field of vision was 10 μm×10 μm. The average values of Ra and Rp were calculated to obtain the Rp/Ra ratio. The Rp/Ra ratio was 8. Thus, it is apparent that the glass substrate was satisfactory and avoided glide errors.

EXAMPLE 2

Similar to example 1 except in that the thickness of the surface layer was 5 nm. The Rp/Ra ratio of the glass substrate in example 2 was 5. Thus, it is apparent that the glass substrate was satisfactory and avoided glide errors.

Comparative Example 1

Similar to example 1 except in that the surface layer removal process S16 was not performed. The Rp/Ra ratio of the glass substrate in example 2 was 11. Thus, it is apparent that since the surface layer removal process S16 was not performed, the projections did not have the same height, and the glass substrate had a rough surface.

Comparative Example 2

The glass substrate of comparative example 2 was obtained by processing a glass plate in the same manner as in example 1 except in that hydrofluoric acid having a concentration of 20 ppm was used in the surface elimination process S16. The Rp/Ra ratio of the glass substrate was calculated and resulted in 18. The comparison of this result and the result of comparative example 1 shows that when using a strong acid solution as the etching liquid in the surface layer removal process S16, the surface of the glass substrate becomes rougher than when the surface layer removal process S16 is not performed and that glide errors are apt to occur.

Comparative Example 3

The glass substrate of comparative example 3 was obtained by processing a glass plate in the same manner as in example 1 except in that sulfuric acid having a pH of 4 was used in the surface formation process and in that the thickness of the surface layer was 1 nm. The Rp/Ra ratio of the glass substrate was calculated and resulted in 12. This result shows that when using only an acid solution in the surface layer formation process or when the thickness of the surface layer is 1 nm or less, the surface of the glass substrate becomes rougher and glide errors are apt to occur.

The embodiment and examples may be modified as described below.

The glass plate 21a may be washed after at least any one of the disk machining process S11, the edge chamfering process S12, the polishing process S13, the surface layer formation process S14, the texture formation process S15, and the surface layer removal process S16. The washing liquid used for the washing may be the strong acid solution, the strong alkaline solution, a neutral solution such as water or pure water, or alcohol such as isopropyl alcohol. In addition, electrolytic water, obtained by performing electrolysis on a solution of a non-organic salt, or functional water, such as gas dissolved water in which gas is dissolved, may be used to perform the washing. The non-organic salt may be an alkaline metal salt such as sodium chloride. The electrolytic water may be water obtained at the anode side or water obtained at the cathode side during electrolysis.

A chemical strengthening process may be performed between any one of the disk machining process S11, the edge chamfering process S12, the polishing process S13, the surface layer formation process S14, the texture formation process S15, and the surface layer removal process S16. In the chemical strengthening process, the surface of the glass plate 21a undergoes a chemical strengthening treatment to improve the impact resistance characteristic, the vibration resistance characteristic, thermal resistance characteristic, and etc. that are required for an information recording medium. In the chemical strengthening treatment, monovalent metal ions contained in the glass composition, such as lithium ions or sodium ions, are ion converted to monovalent metal ions having a greater ion radius, such as sodium ions or potassium ions. The chemical strengthening treatment forms a compression stress layer on the surface of the glass plate 21a and chemically strengthens the surface. The chemical strengthening treatment is performed by immersing the glass plate 21a in a chemical strengthening liquid in which potassium nitrate ($KNO_3$), sodium nitrate ($NaNO_3$), silver nitrate ($AgNO_3$), and etc. are heated and melted. The chemical strengthening treatment is preferably performed under a temperature of about 50 to 150° C. lower than the strain point of the glass material that is used, and more preferably, the temperature of the chemical strengthening liquid is about 350 to 400° C.

The glass material of the glass substrates in the examples is an aluminosilicate glass of which glass composition contains alkaline earth metal oxide and aluminum oxides. However, the glass material is not limited in such manner and soda lime glass, borosilicate glass, or crystallization glass may be used. The soda lime glass, borosilicate glass, and crystallization glass do not have to include any aluminum oxides or may include just a slight amount of oxides. When using these glass materials, the surface layer is formed by the alkaline earth metal ions of the alkaline earth metal oxides dissolved out of the glass composition.

The surface layer 27 does not have to be formed by removing alkaline earth metal ions or aluminum ions and may be formed by removing alkaline metal ions such as potassium ions, sodium ions, and lithium ions.

The texture may be formed without using the texture machine. For example, any device such as a scrub machine may be used as long as it rubs the surface of the glass plate 21a and forms the texture 23. A scrub machine is a device that rubs the surface of the glass plate with a rotatably supported synthetic resin scrub member or foam scrub member (scrub material).

The invention claimed is:

1. A method for manufacturing a glass substrate for an information recording medium, the manufacturing method comprising:

forming a surface layer on a surface of a disk-shaped glass plate having a predetermined composition and a predetermined chemical resistance, with the surface layer having a composition differing from the predetermined composition and a chemical resistance that is lower than the predetermined chemical resistance;

scrubbing the surface in a circumferential direction with an abrasive and a scrub member to form a texture including a plurality of projections each extending in a circumferential direction of the surface, the scrubbing forming the projections extending over the surface layer and a lower layer adjacent to the surface layer by removing the surface layer and the lower layer; and thereafter selectively removing an upper portion of the projections included in the surface layer with an etching liquid, wherein a ratio of a maximum peak height, $R_p$, to an arithmetic mean roughness, $R_a$, of the surface layer is 8 or less.

2. The manufacturing method according to claim 1, wherein the etching liquid is alkaline.

3. The manufacturing method according to claim 1, wherein the glass plate is a multi-component glass material containing at least silicon oxide, and said forming a surface layer includes decreasing the ingredient ratio of at least one component excluding silicon oxide so that the ingredient ratio of silicon oxide in the surface layer is greater than that in a portion excluding the surface layer.

4. The manufacturing method according to claim 3, wherein the multi-component glass material contains at least one of aluminum oxide and alkaline earth metal oxide, and the at least one component is the at least one of aluminum oxide and alkaline earth metal oxide.

5. The manufacturing method according to claim 1, wherein the surface layer has a thickness of 1 to 7 nm.

6. The manufacturing method according to claim 1, wherein said forming a surface layer includes immersing the glass plate in a strong acid solution having a pH of 3.0 or less and then immersing the glass plate in a strong alkaline solution having a pH of 10.5 or greater.

7. The manufacturing method according to claim 1, wherein said forming a texture includes scrubbing the surface so that the projections reach a lower layer of the surface layer.

8. The manufacturing method according to claim 4, wherein said forming a surface layer includes an acid process, for immersing the glass plate in a strong acid solution and dissolving the at least one of aluminum oxide and alkaline earth metal oxide in the strong acid solution to form the surface layer, and an alkaline process, for subsequently immersing the glass plate in a strong alkaline solution, the alkaline process uniformly etching the surface layer to adjust the thickness and adjust the composition of the surface layer.

9. The manufacturing method according to claim 3, wherein the ingredient ratio of silicon oxide in the surface layer is greater than 1.0 time but less than or equal to 1.4 times the ingredient ratio of silicon oxide in the portion excluding the surface layer.

10. A method for manufacturing a glass substrate for an information recording medium, the manufacturing method comprising:

preparing a disk-shaped glass plate having a predetermined composition and a predetermined chemical resistance;

polishing the glass plate to form a smooth surface;

chemically processing the smooth surface to form a surface layer having a composition differing from the predetermined composition, a chemical resistance that is lower than the predetermined chemical resistance, and a first thickness;

forming a texture in a circumferential direction, the texture including a plurality of projections on the surface, each of the projections extending in a circumferential direction, wherein the projections extending over the surface layer and a lower layer adjacent to the surface layer are formed by removing the surface layer and the lower layer; and thereafter selectively removing only part of the plurality of projections included in the surface layer so that the plurality of projections have flat upper surfaces that are flush with each other, wherein a ratio of a maximum peak height, $R_p$, to an arithmetic mean roughness, $R_a$, of the surface layer is 8 or less.

11. The manufacturing method according to claim 10, wherein said forming a surface layer includes scrubbing the surface with a scrub member in a circumferential direction of the glass plate.

12. The manufacturing method according to claim 10, wherein said removing includes uniformly etching the surface layer so that the surface layer remaining on the lower layer has a second thickness that is less than the first thickness.

* * * * *

UNITED STATES PATENT AND TRADEMARK OFFICE
CERTIFICATE OF CORRECTION

PATENT NO.      : 7,611,639 B2                      Page 1 of 1
APPLICATION NO. : 10/532538
DATED           : November 3, 2009
INVENTOR(S)     : Saito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this

Twelfth Day of October, 2010

David J. Kappos
*Director of the United States Patent and Trademark Office*